Figure 1:
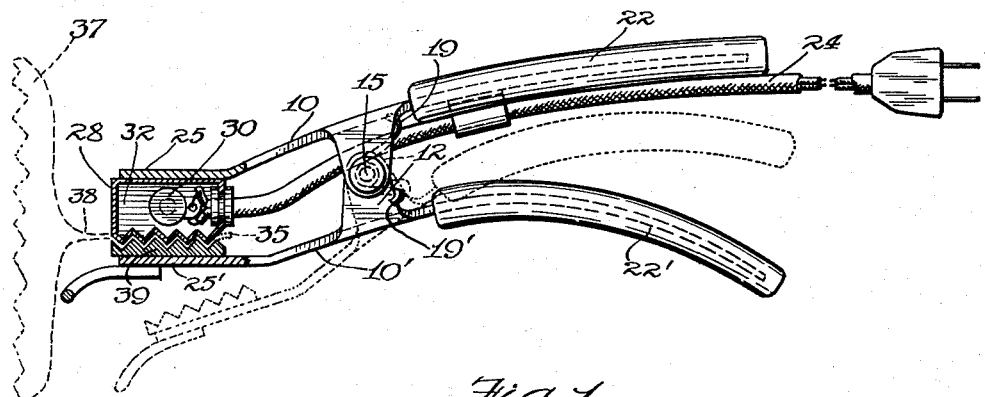

Sept. 9, 1952   C. M. WILLIAMSON ET AL   2,610,137
ELECTROTHERMAL BAG SEALER
Filed Aug. 16, 1948

INVENTORS
Cecil M. Williamson
Earl D. Boisselier
BY
Frank H. Marks
S. J. Collons,
Attorneys

UNITED STATES PATENT OFFICE 2,610,137

ELECTROTHERMAL BAG SEALER

Cecil M. Williamson, Elmhurst, and Earl D. Boisselier, Glen Ellyn, Ill., assignors to Sears, Roebuck and Co., Chicago, Ill., a corporation of New York Application August 16, 1948, Serial No. 44,476

4 Claims. (Cl. 154—42)

Our invention relates to devices for closing and sealing bags and the like formed of heat fusible material, such as plastics of a wide variety of chemical compositions, including the various natural and synthetic resins. Such materials are present on the market in such large number and variety that it is unnecessary for us to describe them with greater particularity. They may be either transparent or non-transparent, but all have the general characteristic of being formable in relatively thin films of high flexibility and will soften or melt when heat is applied to them, so that adjacent films will mutually adhere and become self-sealing. Waxed and other coated and impregnated papers and the like may also be used in connection with our invention. Such containers, when so sealed, are especially useful as containers for foodstuffs, and especially for storage in a home freezing unit, being inexpensive, convenient and providing an hermetic inclosure.

Our invention provides a hand tool for grasping the open end of such a container after it has been filled and pressing together the adjacent sides of the container, while at the same time, applying sufficient heat to fuse, soften or melt the films of material forming the container, or the coating or impregnating material in the case of waxed paper and similar materials. After a very short interval of pressure and heat, the bag is released in hermetically sealed condition and the tool is immediately ready for operation on another container.

Our improved tool is exceptionally simple in construction, light in weight and compact and relatively inexpensive to manufacture.

A tool forming the subject matter of our invention is so designed as to make a substantially complete seal which effectively prevents the escape of moisture or other elusive flavoring vapors from within the container as well as preventing admission of air. This is accomplished by providing a plierlike tool, the jaws of which are formed with interlocking corrugated surfaces, whereby the closed and sealed end of the bag is given a plurality of waves or like deformations extending transversely of the major axis of the bag, thus providing a tortuous path for either the admission or escape of vapors or gases to or from the inside of the container. By reason of the tortuous formation thus imparted to the sealed surfaces, passage of gas is rendered exceptionally difficult even though, through some misadventure, occasionally unsealed spots might conceivably be left after a sealing operation on a container.

Figure 2:
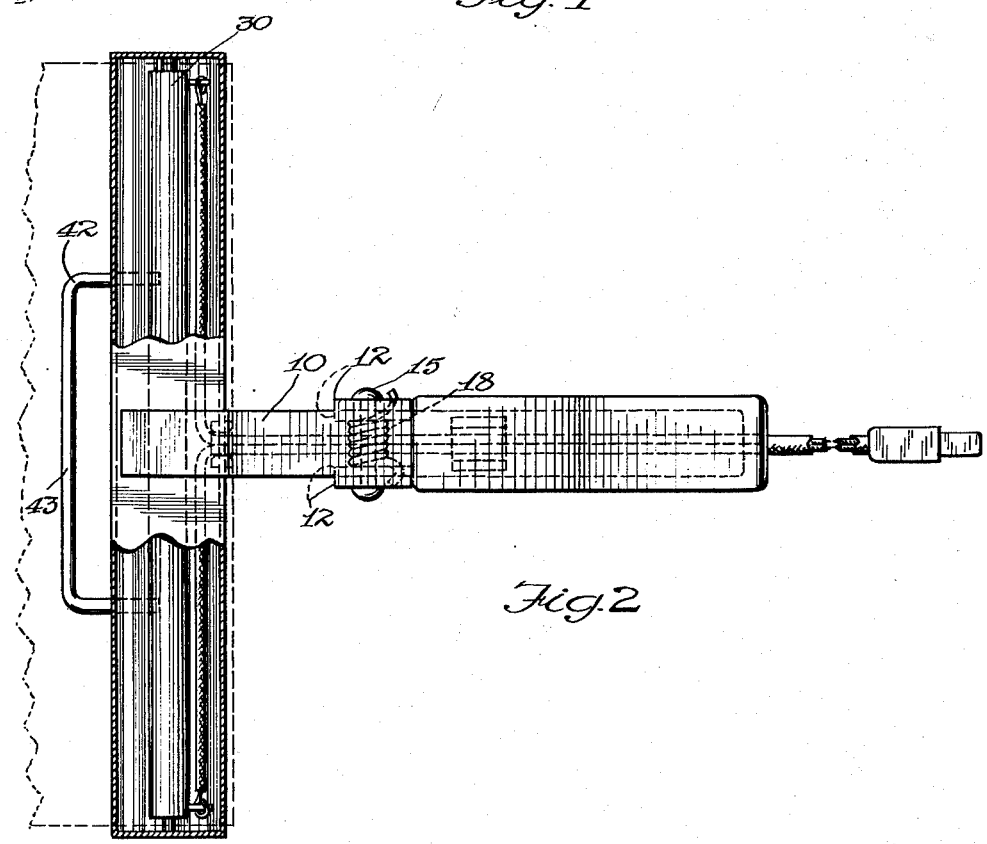

Our invention will be best understood by reference to the appended drawings forming a part of this specification, wherein Fig. 1 is a side elevational view, partly in section, of a tool embodying our invention; and Fig. 2 is a top plan view of the same with portions shown in section.

The numerals 10 and 10' indicate a pair of lever arms which may be formed of any suitable material, such as metal stampings or the like, and each having a pair of ears 12 extending substantially normally from the major plane of said arms to form nesting pintles for a stud 15 which serves as a pivot for said arms. The ears 12 of the adjacent lever arms, of course, are bored to receive the stud 15 which may be riveted over or secured by a nut or the like. A coil spring 18 disposed on the pintle 15 is normally under tension and has extensions 19, 19' reacting against the levers 10, 10', respectively, in such a way that the operative ends of the lever arms are normally urged together in interengaging relation, as seen in Fig. 1.

Handle grips 22, 22' are disposed on the manipulating ends of the levers 10, said grips being formed of rubber or any other suitable insulating material. An electrical conduit 24 extends between the levers 10 in substantially parallel relation thereto and may be secured by a suitable clip or other means.

Referring now to the operative ends 25, 25' of the levers, it will be noted that, while the major portions of the levers 10, 10' are slightly curved, the end portions 25, 25' are bent at obtuse angles from the major portions of the arms so as to lie in substantially parallel planes when the tool is in normal operative position, as shown in Fig. 1. Secured to one of the levers, such as 10, is an elongated housing 28 for a resistance-type heating element indicated at 30. The housing 28 may be formed of sheet metal or other suitable material and the space 32 between the heater 30 and the housing may be filled with suitable heat retaining materials, according to principles and practice well known in the electrical heating appliance art.

It will be seen that the housing 28 as well as the heater element contained therein extend transversely of the levers 10, 10' for a substantial distance, and that the lower face 35 of the housing is provided with parallel waves or corrugations extending parallel to the major axis of the housing, which would be transversely of the opening of the bag to be operated upon, as indicated at 37.

Secured to the end portion 25' of lever 10' is a jaw member 39 formed of cast metal or other suitable material and, also, provided with parallel grooves, ridges or deformations therein corresponding to the deformations 35 in the housing 28. Said jaw member 39 may be secured to the lever as by welding or the like and is substantially coextensive in its dimensions to the cooperating face 35 of the housing 28, so as to mesh therewith.

Secured to the outside face of the end portion 25' of lever 10' is a member 42 which may serve as a support for the tool when the latter is placed on a table or other surface. The support 42 may be U-shaped or could be formed in a wide variety of other forms, a major consideration being that the portion 43 which lies on the table extends out of the plane of the lever and away from the heater element and the cooperating jaw 39. The support 42, being formed of relatively light gauge wire or similar material, will dissipate heat rapidly and, hence, if it should be placed on a varnished surface, there would be no danger of marring the same even though the heater is hot enough to be operative.

It will be seen that the tool which we have provided is extremely simple and the use thereof will be convenient and thoroughly satisfactory when the conductor 24 is plugged into a source of electrical current. The heater element 30 will rapidly warm up to an operative temperature, and as the jaw 39 is normally in contact with the heater, both elements will soon be hot enough to function.

The bag 37, which has been filled and is ready to be sealed, has its end portions 38 brought together, as seen in Fig. 1, and the operator grips the handle grips 22, 22' and by squeezing separates the jaws and brings the end portions 38 of the bag into proper relation with one of the jaws. Upon releasing pressure on the grips, the spring 18 will bring the hot jaws together in sealing relationship to the bag, as seen in Fig. 1. The spring 18, of course, will have been so formed that it will impart sufficient pressure to seal the bag. It is found that a few seconds' contact with a thermoplastic bag of our improved tool is sufficient to impart a satisfactory seal to the container, and that containers of this type may be sealed in rapid succession thereby.

By having the jaws transversely elongated with respect to the levers and by having them open at their ends, the device may be used to operate on bags of a wide variety of widths. Thus, if one should encounter bags wider than the jaws, it is only necessary for the operator to take a succession of adjacent "bites" on the bag with our tool, first gripping the end of the bag adjacent one side and then moving the tool toward the opposite side to take as many more additional "bites" as may be necessary.

It will be seen that we have provided an extremely practical tool for accomplishing the desired purpose, it being light in weight and conveniently used by a person of slight strength.

Various changes coming within the spirit of our invention may suggest themselves to those skilled in the art, our disclosure being merely exemplary and not intended as limiting to any specific form.

Obviously, while we have shown a heater element applied to only one jaw, both jaws may, if desired, be so devised.

We claim:

1. A hand tool for sealing a thermoplastic bag, comprising a pair of lever arms pivoted together intermediate their ends, the arms on one side of the pivot serving as handles, relatively long, narrow transverse jaws on the ends of said arms opposite said handles, said jaws having a plurality of interengaging deformations cooperating to provide a tortuous path for gas tending to enter or leave a container sealed by said tool, and electrical means for heating one of said jaws.

2. A tool as defined in claim 1 wherein the deformations consist in a series of alternate ribs and grooves extending parallel to the major axis of the jaws.

3. A tool as defined in claim 1 having means for supporting the tool in spaced relation to a supporting surface, said means comprising a tenuous loop carried by one of said jaws.

4. A tool as defined in claim 1 having means for supporting the tool in spaced relation to a supporting surface, said means comprising a U-shaped member having its ends secured to one of said jaws, said member extending forwardly and downwardly from the jaw to which it is secured when the tool is disposed on a horizontal surface.

CECIL M. WILLIAMSON.
EARL D. BOISSELIER.

REFERENCES CITED

The following references are of record in the file of this patent:

UNITED STATES PATENTS

| Number | Name | Date |
|---|---|---|
| 728,883 | Downes | May 26, 1903 |
| 1,474,825 | Howard | Nov. 20, 1923 |
| 2,341,933 | Mestitz | Feb. 15, 1944 |
| 2,349,126 | Abernathy | May 16, 1944 |
| 2,441,817 | Huff | May 18, 1948 |
| 2,443,749 | Stunkel | June 22, 1948 |
| 2,496,609 | Antwerpen | Feb. 7, 1950 |